United States Patent [19]

Braum

[11] Patent Number: 4,763,605

[45] Date of Patent: Aug. 16, 1988

[54] MILKING SYSTEM

[76] Inventor: William H. Braum, Box 1100, Tuttle, Okla. 73089

[21] Appl. No.: 937,661

[22] Filed: Dec. 3, 1986

[51] Int. Cl.[4] .............................................. A01J 3/00
[52] U.S. Cl. .............................. 119/14.03; 119/14.02; 119/14.04; 119/14.08
[58] Field of Search .............. 119/14.02, 14.03, 14.04, 119/14.08, 14.18, 16, 28

[56] References Cited

U.S. PATENT DOCUMENTS

| | | | |
|---|---|---|---|
| 2,477,035 | 7/1949 | Babson et al. | 119/16 |
| 2,593,597 | 4/1952 | Palmer | 119/27 |
| 2,617,382 | 11/1952 | Duncan | 119/14.03 |
| 2,689,546 | 9/1954 | Petri | 119/14.03 |
| 2,740,377 | 4/1956 | Duncan | 119/14.03 |
| 2,742,876 | 4/1956 | Duncan | 119/14.09 |
| 2,793,612 | 5/1957 | Babson | 119/14.03 |
| 3,059,616 | 10/1962 | Cline | 119/14.03 |
| 3,223,070 | 12/1965 | Gribble et al. | 119/16 |
| 3,877,419 | 4/1975 | Rodger | 119/14.03 |
| 4,006,712 | 2/1977 | Peel | 119/14.03 |
| 4,010,714 | 3/1977 | Notsuki et al. | 119/14.03 |
| 4,034,713 | 7/1977 | Umbaugh | 119/14.02 |
| 4,386,581 | 6/1983 | Rokhvarg | 119/14.03 |

Primary Examiner—Robert P. Swiatek
Assistant Examiner—Joyce M. Britt
Attorney, Agent, or Firm—Dunlap, Codding & Peterson

[57] ABSTRACT

A milking system for cows having a pair of parallel rows of milking stalls on an upper floor and an operator's cart adapted to move along the rows of stalls on a lower floor. An elongated opening is formed in the upper floor along the stalls through which one or more operators on the operator's cart may have access to the udder and teats of the cows to be milked. The stalls are provided with entry and exit gates; doors are provided for the elongated opening; spray bars are provided for cleaning and disinfecting the cows udders and teats; and suitable milking machines are provided for connection by the operators.

12 Claims, 13 Drawing Sheets

MILKING SYSTEM

BRIEF SUMMARY OF THE INVENTION

1. Field of the Invention

This invention relates to improvements in milking systems, and more particularly, but not by way of limitation, to an improved milking system particularly suited for cows.

2. Background of the Invention

Undoubtedly the most important improvement in the cow milking art has been the development of milking machines, whereby the milk is drawn from a cow by a vacuum without the need for a human being physically grasping and manipulating the cow's teats. Milking machines have been employed in various arrangements, including milking parlors containing a plurality of stalls with the necessary teat cups available at each stall. In those systems, however, the cow's udders and teats have not been readily accessible and, there has at least, generally, been a requirement for an excessive amount of human labor, particularly when large numbers of cows are being milked. It is also known to utilize an arrangement where the cow to be milked is on one level and a moving milking machine on a second level. In this latter instance, however, the arrangement has been unduly complicated.

In accordance with the present invention, a milking system is provided where a large number of cows can be placed in milking stalls; cleaned; milked in quick succession, and the teats and udders sterilized in a minimum of time with a minimum of manual labor required. Furthermore, the system may be quickly and efficiently reused with a new group of cows in a minimum period of time, such that a system according to this invention having, for example, about one hundred milking stalls can be used to service a diary herd of about six thousand cattle.

BRIEF DESCRIPTION OF THE DRAWINGS

FIG. 6 is a perspective view of the structure shown in FIGS. 4 and 5, but illustrating only a portion of a module.

FIG. 16 is a perspective view of the equipment illustrating the position of the equipment when the teat cups are being installed.

DETAILED DESCRIPTION OF THE DRAWINGS

Figure 1:
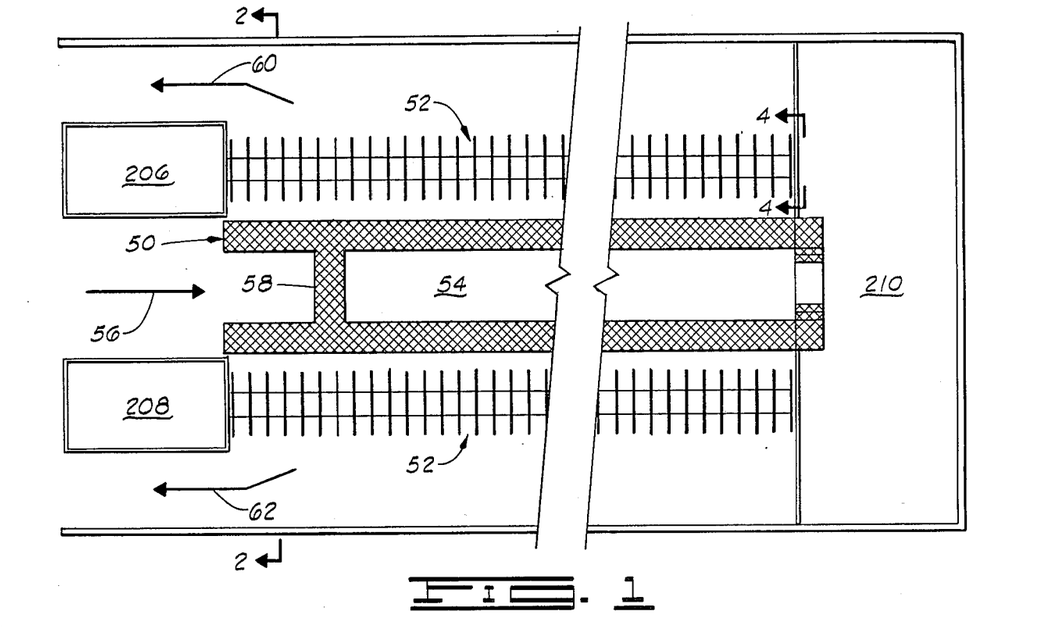
FIG. 1 is a schematic layout of a milking system constructed in accordance with this invention.
Figure 2:
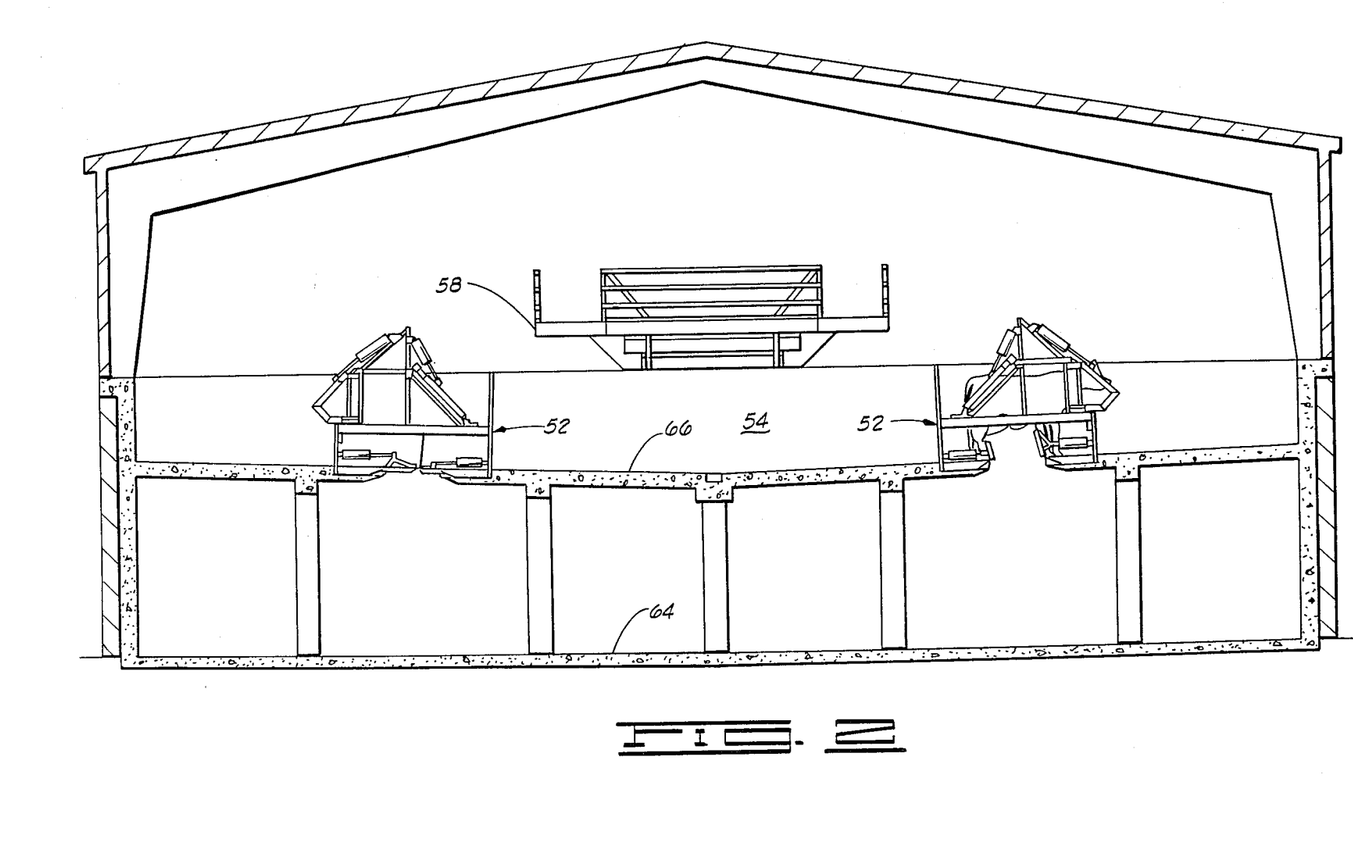
FIG. 2 is a schematic cross sectional view taken along lines 2—2 of FIG. 1.

Referring to the drawings in detail, and particularly FIGS. 1 and 2, reference character 50 generally designates a typical layout of a milking system constructed according to this invention. In a typical arrangement, there are two parallel rows of milking stalls 52 with a space 54 between the two rows. It will be understood that the system is normally installed in a suitable building. The cows to be milked are herded into the building in the direction indicated by the arrow 56. An operator on an elevated catwalk 58 directs the cattle into the milking stalls 52. Preferably, the cows are directed into the milking stalls 52 one after another, such as starting at the left hand side of FIG. 1 with the cows being first directed into the stalls 52 at the upper side of the drawing with each stall being filled from the left to the right. After the milking operation is completed with respect to any particular group of cows, they are directed out of the building as indicated by the arrows 60 and 62.

Figure 3:
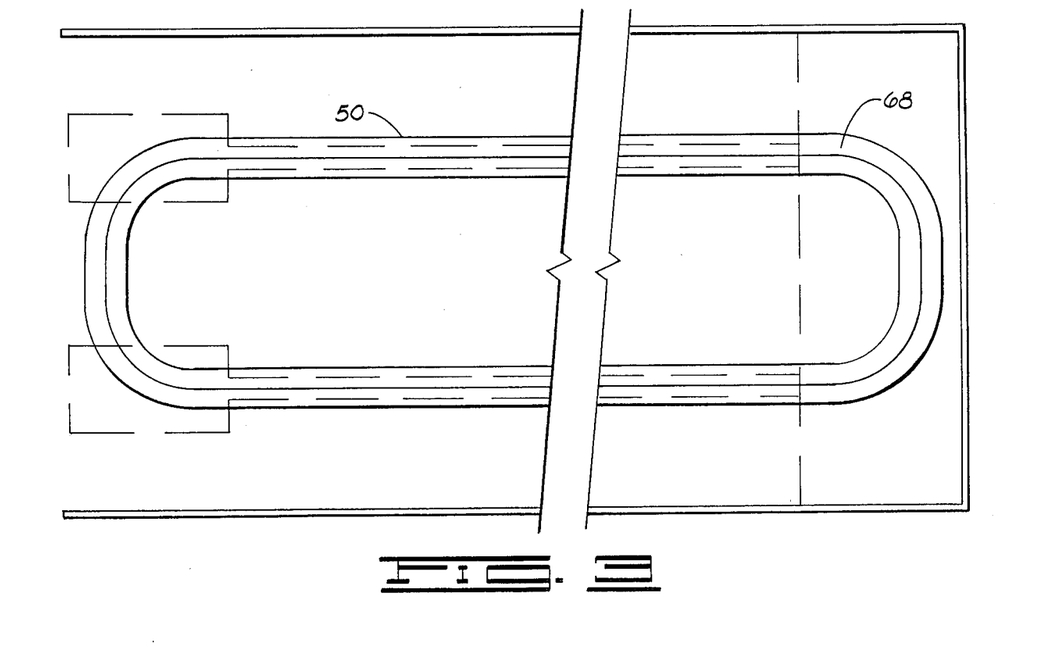
FIG. 3 is a schematic layout of a portion of a milking system constructed in accordance with this invention showing the path of movement of the operator's cart.

As will be described more fully later, the cows in the stalls 52 are sequentially milked through the services of one or more operators moving in an operator's cart on a floor 64 which is lower than the floor 66 where the cows are located. FIG. 3 illustrates a typical path 68 for the operator's cart. It will there be noted that the cart will be moved along one of the rows of stalls 52 and then directed into the next row of stalls to complete a race track type of pattern—assuming that the system is employing two parallel rows of milking stalls.

Figure 4:
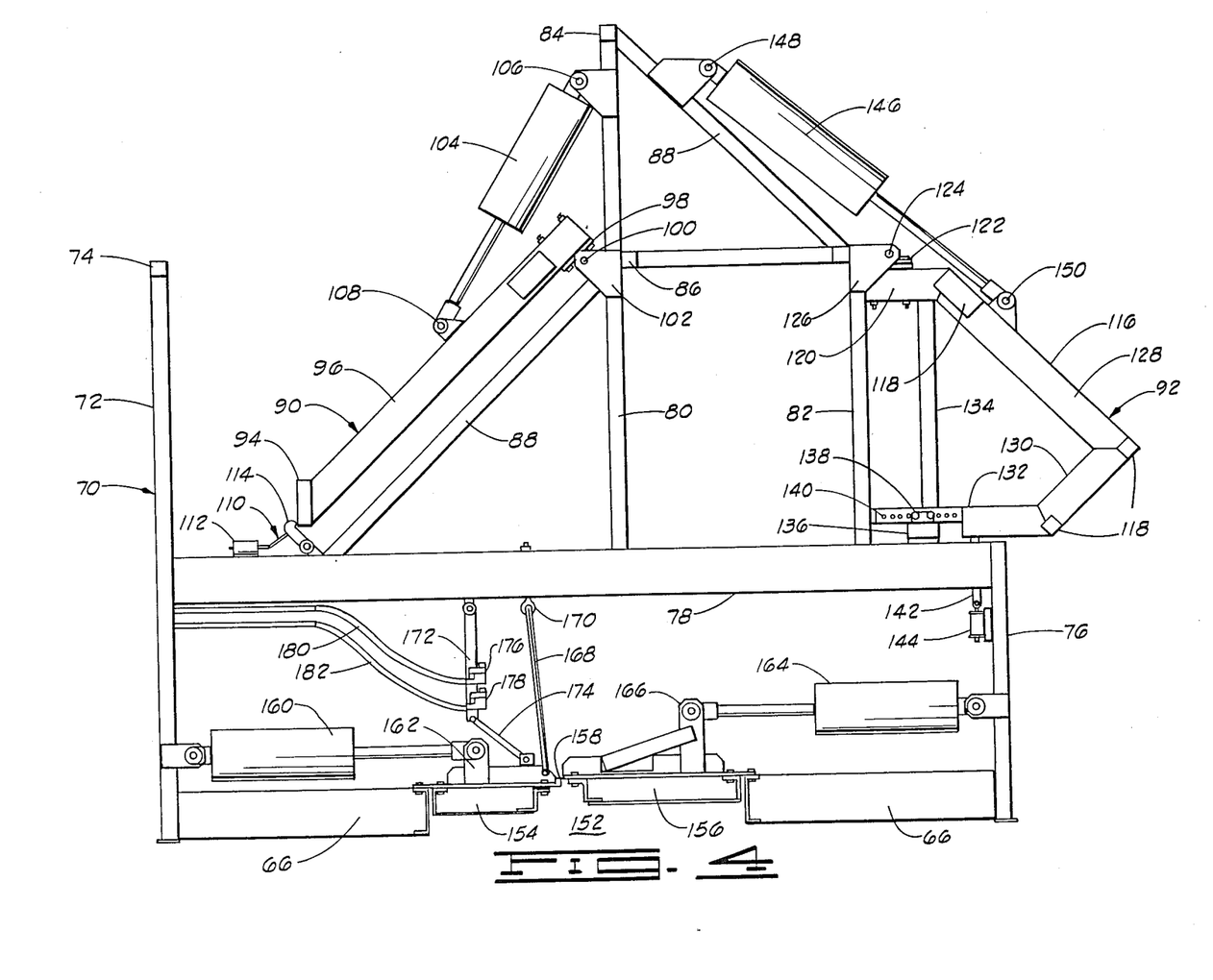
FIG. 4 is a cross sectional view of the upper floor level taken along lines 4—4 of FIG. 1.
Figure 5:
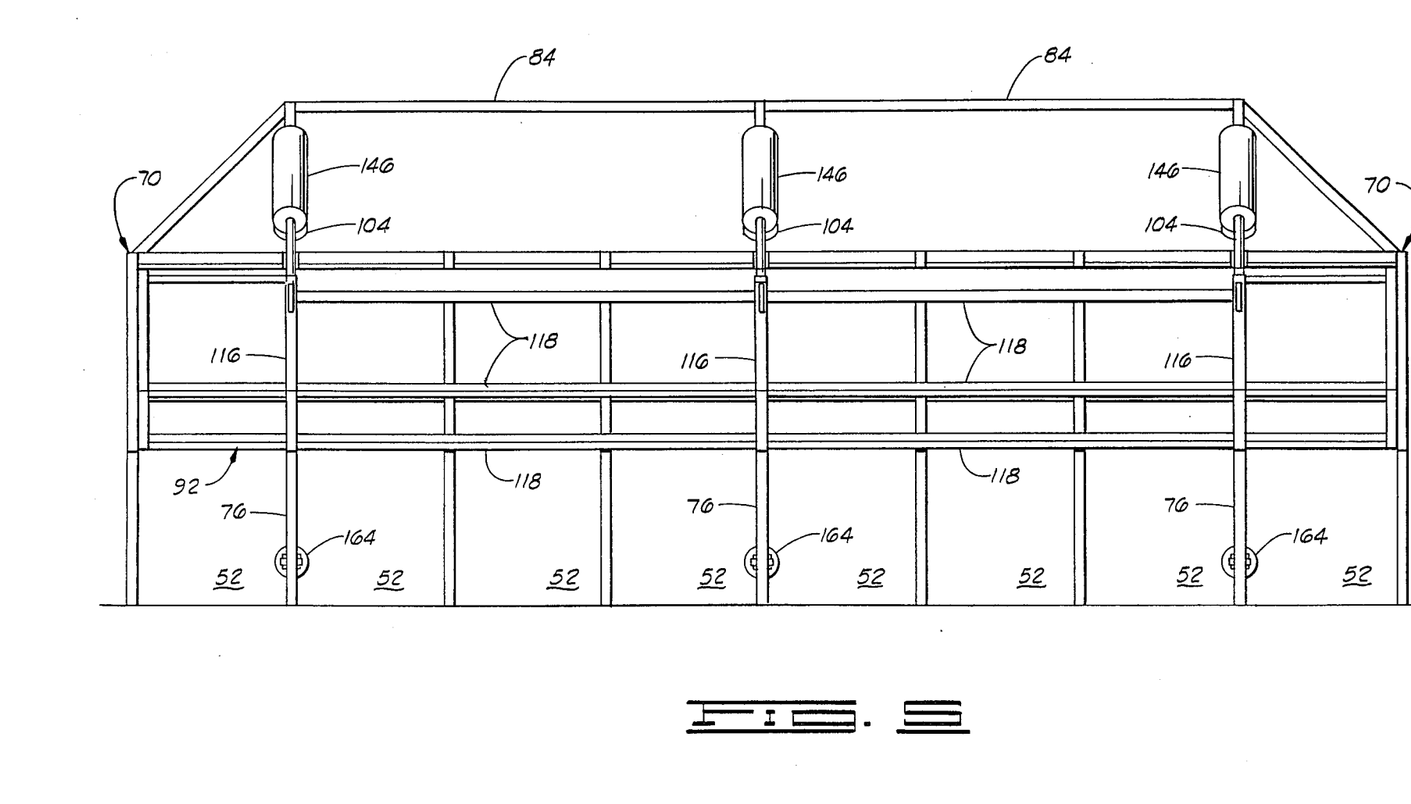
FIG. 5 is an end view looking at the right hand end of the structure shown in FIG. 4, but illustrating a typical module of eight milking stalls.

As illustrated in FIGS. 4, 5 and 6, a framework generally designated by reference character 70 is suitably supported on the upper floor level 66 to form the milking stalls 52. In the arrangement depicted, the left hand end of the framework 70 illustrated in FIGS. 4 and 6 is the entry end of a stall and the right hand end is the exit end. The framework 70 is preferably constructed to provide a module of eight stalls, as shown in FIG. 5. The framework 70 includes a vertical post or stanchion 72 at each side of the entry end of each stall and the upper ends of the stanchions 72 are connected by a cross member 74 for bracing purposes. The cross member 74 is at an elevation well above the height of any cow which may be directed into the respective stall.

Shorter posts or stanchions 76 are located at each side of the exit end of each stall. Each aligned pair of posts 72 and 76 are interconnected by a horizontal rail 78. The rails 78 are preferably at a level roughly conforming to the tops of the legs of a cow standing in the respective stall to confine the cow from the sides at a level which will not interfere with the cow walking into the stall. The framework 70 further includes a vertical member 80 extending up from about the center of each of the side rails 78 and a second, shorter vertical member 82 extending upwardly from the rails 78 adjacent the exit end of the stall. The upper ends of the members 80 and 82 are interconnected by cross bracing 84 and 86. Also, angular bracing 88 is provided between the vertical posts—all for strength of construction with a minimum of materials.

Each module of stalls has an entry gate 90 and an exit gate 92 pivotally connected to the framework. The entry gate comprises a horizontal bar 94 and arms 96 extending transversely therefrom. The horizontal bar 94 extends the entire length of the module in order to extend across each one of the milking stalls 52. The end of each arm 96 opposite the bar 94 is provided with a suitable bearing assembly 98 which surrounds a shaft 100 carried between a pair of plates 102 attached to the vertical post 80. With this arrangement, the entry gate 90 may be pivoted from the position shown in FIG. 4 in a clockwise direction around a horizontal axis (the shaft 100) for opening the entry end of the stalls and, conversely, pivoted in a counterclockwise direction back to the position shown in FIG. 4 for closing the entry end of the stalls. Such pivoting movement is accomplished by a suitable pneumatic or hydraulic ram 104 having the cylinder end thereof pivotally secured by a pin 106 to the vertical post 80 and the rod end thereof pivotally secured by a pin 108 to a medial portion of the respective arm 96. As illustrated in FIG. 5, there are three of such rams for each module in the preferred design—one for each arm 96. And, the rams 104 will be operated in unison by a suitable control system (not shown) as will be further described.

A locking mechanism 110 is mounted on a horizontal rail 78 of each module for selectively locking the entry gate 90 in the closed position as illustrated in FIG. 4. Each locking mechanism 110 basically comprises a solenoid 112 controlling a pivoting pawl 114 which selectively engages the cross bar 94. The solenoid 112, and thus the pawl 114, is operated by a suitable control system as will be described.

The exit gate 92 comprises three frames 116 interconnected by a series of horizontal bars 118. Each frame 116 comprises an upper section 120 having a suitable pillow block bearing 122 secured thereto. The bearing 122 engages a shaft 124 carried by the vertical post 82 by suitable plates 126, such that the exit gate 92 may be pivoted between its open and closed positions about a horizontal axis. An angular bar 128 extends downwardly from the section 120 and interconnects with another angular bar 130. The bar 130, in turn, is connected to a lower bar 132 which, in the closed position of the gate 92, extends horizontally. The sections 120 and 132 are interconnected by vertical bracing 134 to provide strength to the gate structure. A confining bar 136 is secured to each of the gate sections 132 by cooperating bolts 138 and bolt holes 140. It will be noted there are a series of bolt holes 140, such that the position of the bar 136 may be varied, depending upon the sizes of the cows to be milked. The bar 36 is not precisely positioned to continually engage the brisket of a cow, but is in such a position that the forward movement of the cow will be restricted when the exit gate 92 is closed.

A locking pin 142 is connected to a solenoid 144, in turn mounted on the post 76. The pin 142 extends into a cooperating bore in the section 132 of the exit gate 92 when it is desired to lock the gate 92 in a closed position. The solenoid 144 will operate to extend and retract the pin 142 and is operated by a suitable control system in a manner to be described. The exit gate 92 is pivoted from the closed position shown in FIG. 4 in a counterclockwise direction by use of suitable rams, such as pneumatic rams, 146. The cylinder end of each ram 146 is pivotally connected by a pin 148 to the framework bracing 88, and the rod end of each ram is pivotally connected to one of the bars 128 of the gate 92 by a pin 150. In a modular construction of the type previously mentioned, the gate 92 will span all of the exit ends of all of the stalls and there are preferably three rams 146 employed to operate the gate 92 as shown in FIG. 5. The operation of a control system for the rams 146 to control the sequence of operation of the gate 92 will be described below.

An elongated opening 152 is formed in the upper floor 66. The opening 52 extends throughout the length of the area covered by a row of milking stalls. That portion of the elongated opening 152 spanning any one module of milking stalls is provided with a pair of overlapping doors 154 and 156. The door 154 is hinged to the floor 66 at one side of the opening 152 and the door 156 is hinged to the floor 66 at the opposite side of the opening. An extension 158 of the door 156 overlies the free end of the door 154 when the doors are in a closed position as illustrated in FIG. 4.

The door 154 is pivoted between its open and closed positions by a ram 160, preferably a pneumatic ram. The cylinder end of the ram 160 is pinned to a vertical post 72 and the rod end of the ram is pinned to an extension 162 extending upwardly from the door 154.

The door 156 is pivoted between its open and closed positions by a ram 164, preferably a pneumatic ram. The cylinder end of the ram 164 is pinned to a post 76 of the framework 70 and the rod end of the ram 164 is pinned to an extension 166 extending upwardly from the door 156. In view of the overlapping of the door 156 over the door 154, the door 156 will be the first to open and the last to close.

A cable 168 has one end secured to an eye-bolt 170 anchored in a horizontal rail 78 and its opposite end secured to the free end of the lower door 154. The length of the cable 168 is such to provide support for the doors 154 and 156 when they are in a closed position.

As previously indicated, the doors 154 and 156 extend throughout the length of the respective module of stalls. With a module having eight stalls, three of each of the rams 160 and 164 are employed to open and close the doors 154 and 156 in a sequence to be described.

A spray bar 172 is pinned at its upper end to a horizontal rail 78 above the elongated opening 152 and at its lower end to a second bar 174. The opposite end of the bar 174 is pinned to the door 154. The lengths of the bars 172 and 174 are such that the bar 172 is substantially vertical when the door 154 is closed, as shown in FIG. 4. When the door 154 is opened, the bar 172 is pivoted clockwise around its upper end to clear the area immediately above the opening 152. The bar 172 carries two sets of spray nozzles 176 and 178. One set of spray nozzles 176 are connected to a source of water and soap solution illustrated by the hose 180 and the nozzles 178 are connected to a source of a disinfectant, such as iodine, as illustrated by the hose 182. There is a bar 172 and a set of nozzles 176 and 178 suspended from each horizontal rail 78 at each side of each stall. The nozzles 176 and 178 are directed to spray water or iodine onto the respective side of the udder and teats of a cow positioned in the stall as will be further described below.

Figure 7:
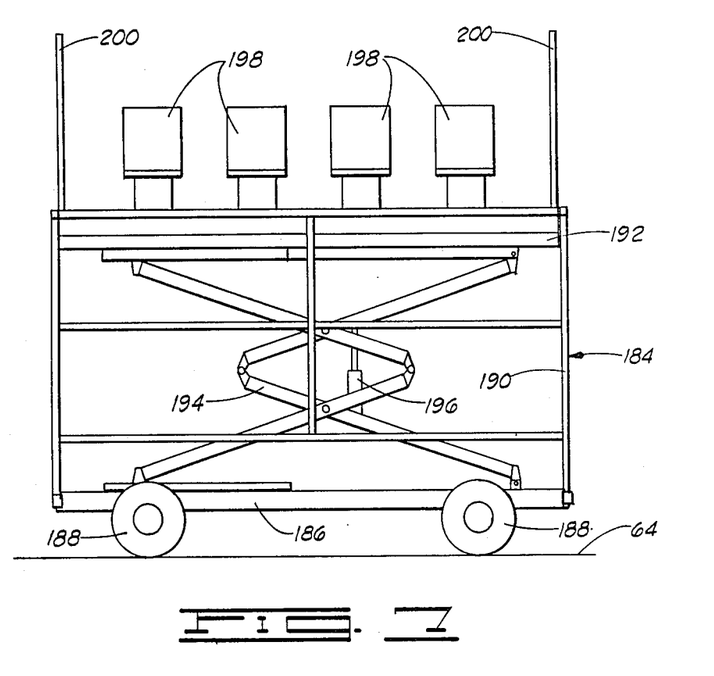
FIG. 7 is a side view of an operator's cart with the working platform in a raised position.
Figure 8:
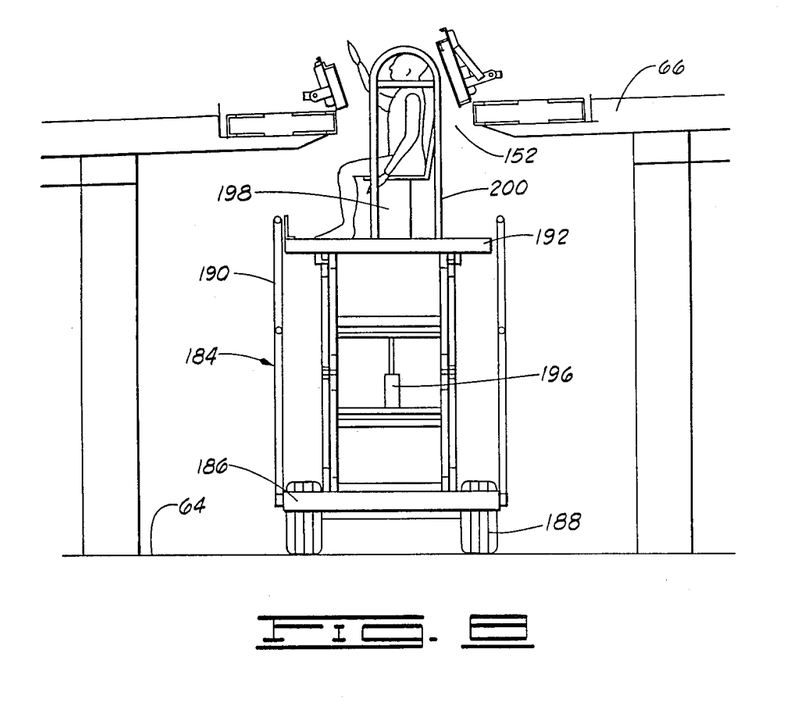
FIG. 8 is an end view of the operator's cart with the working platform raised.
Figure 9:
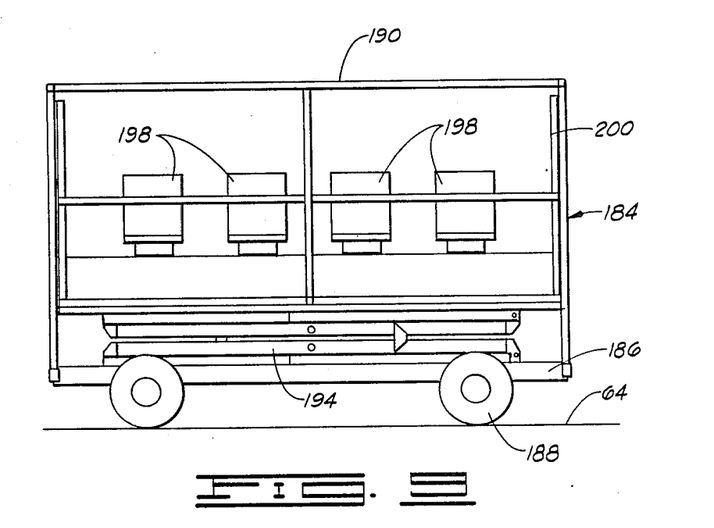
FIG. 9 is a side view of the operator's cart with the platform in a lowered position.
Figure 10:
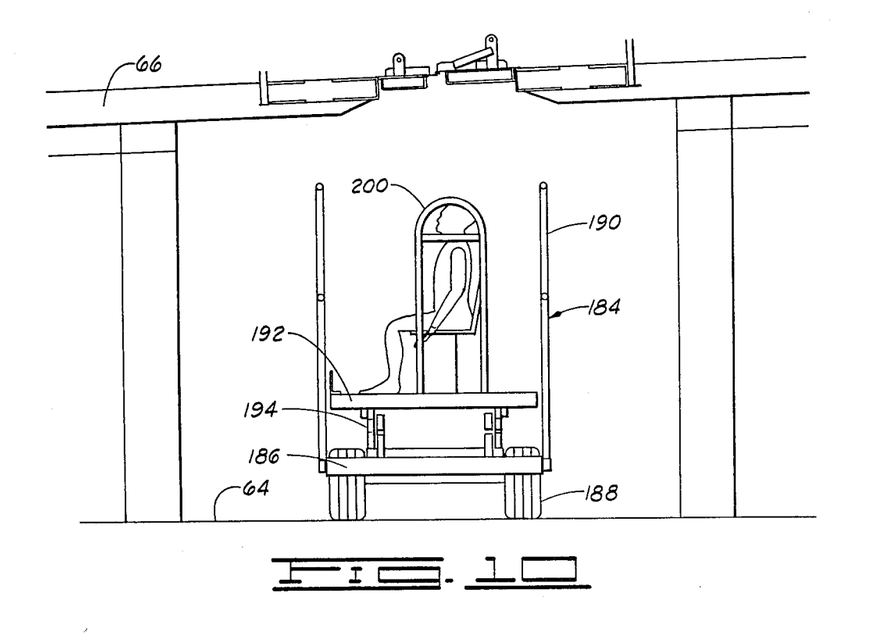
FIG. 10 is an end view of the operator's cart with the platform in a lowered position.

An operator's cart for use in the system is illustrated in FIGS. 7-10 and generally designated by the reference character 184. As shown in FIGS. 7 and 8, the cart 184 comprises a base 186 having suitable rubber tired wheels 188. A suitable drive system (not shown) will be provided on the base 186 of the cart and connected to at least one set of the wheels 188 to drive the cart around the path 68 previously referred to in connection with FIG. 3. Suitable side rails 190 are provided on both sides of the cart 184 extending upwardly from the base 186. The cart is also provided with a working platform 192 supported on the base 186 by a lift mechanism 194, such as a scissors lift. When the ram 196 of the lift mechanism is expanded, the working platform 192 is elevated to a raised position illustrated in FIGS. 7 and 8. Conversely, when the ram 196 is retracted, the lift lowers the working platform downwardly to a position a short distance above the base 186 as illustrated in FIGS. 9 and 10. In this lowered position, it will be noted that the side rails 190 extend substantially above the working platform 192.

In the preferred system, four operator seats 198 are mounted on the working platform 192 in side by side relation along the length of the cart. Also, guards 200 are provided on each end of the working platform 192 for the protection of the workers occupying the end seats 198. The cart 184 is sized such that the cart rides on the lower floor level 64 and when the lift 194 is extended, the workers in the seats 198 will be raised into the elongated opening 152 through the upper floor 66 to an extent such that the heads and shoulders of the workers will be above the level of the upper floor 66 as illustrated in FIG. 8. It will also be noted in this Figure that the guards 200 at the opposite ends of the cart 184 are sized to move lengthwise through the opening 152 during operation of the system.

Figure 11:
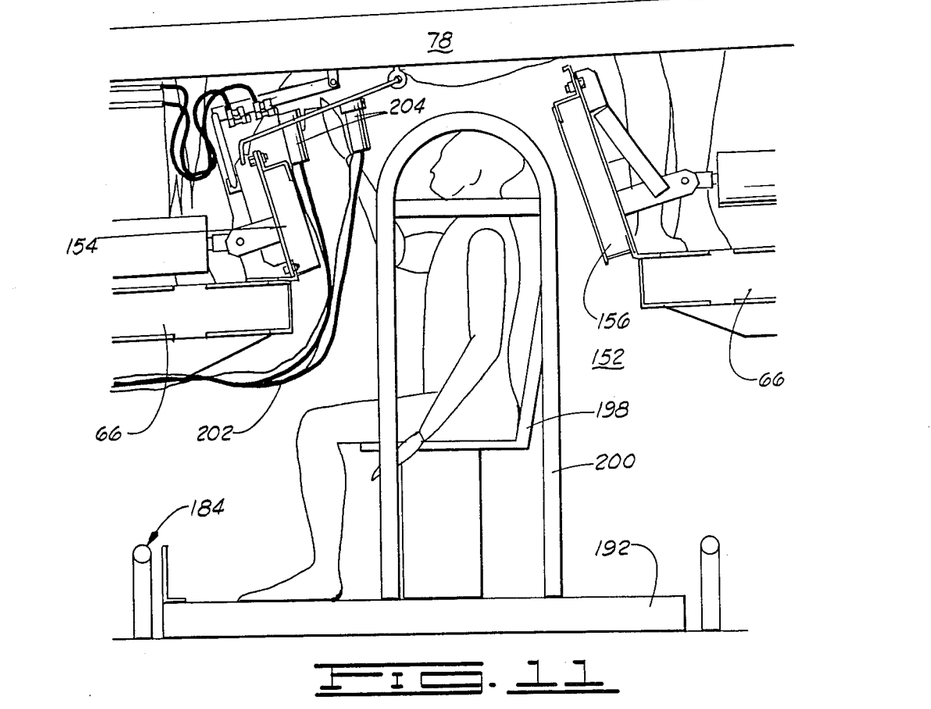
FIG. 11 is a schematic side view of the upper floor level in the area where the teat cups are installed and also illustrating a typical position of an operator installing the teat cups.

As indicated in FIG. 11, the milking system of this invention also includes a milking machine which includes a set of hoses 202 and teat cups 204 at each stall. Preferably, there is a central milking header under constant vacuum connected to the hoses 202 for all of the stalls of a milking system constructed according to this invention. Each of the hoses 202 has a cut-off valve (not shown) therein, which is preferably automatically controlled to connect and disconnect the teat cups for the respective hose to and from the source of vacuum when desired. The hoses 202 at each stall location can be secured to the supporting structure in any suitable manner, such as being strapped to the door 154 in such a position that the teat cups 204 will be readily accessible to a worker on the cart 184 when the door 154 is opened. Also, of course, there will be sufficient slack in the hoses 202 for the worker to easily connect the teat cups 204 to the teats of the cow being milked.

Operation

As will be understood, a milking system according to this invention may contain virtually any desired number of modules of milking stalls, preferably with the modules being arranged in two parallel rows as illustrated in FIG. 1. In use, the cows are directed into the area of the stalls as indicated by the arrow 56 in FIG. 1 and the stalls of the first module to the left end of the upper row of stalls is first completely filled with cows, then the next module, etc., thoughout the system. As previously indicated, a worker on the catwalk 58 can easily direct the cows into the desired stalls.

Figure 12:
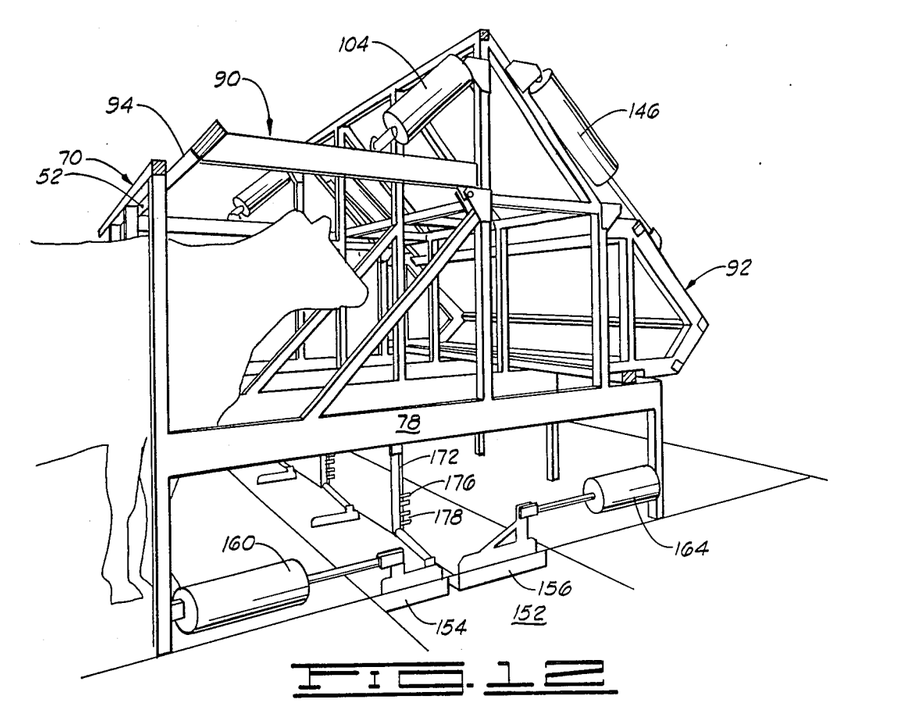
FIG. 12 is a schematic perspective view similar to FIG. 6 illustrating the position of the equipment when a cow is entering a stall.

The detailed operation of the system is best illustrated starting with FIG. 6 where it will be noted that both the entry gate 90 and the exit gate 92 are closed and locked; the doors 154 and 156 are closed and a cow is waiting at the entry end of a stall. With the cow ready to enter the stall 52, the entry gate is unlocked and the rams 104 are operated to open the entry gate 90 to the position illustrated in FIG. 12 where it will be noted that the cross bar 94 of the entry gate is above the level of the cow. Thus, the cow can be directed into the stall. In doing so, it will be noted that with the doors 154 and 156 closed, the cow will have a relatively smooth surface upon which to walk. The cow will be directed between the adjacent side rails 78 of the framework 70, such that the feet of the cow will not become engaged with either the bars 172 or the rams 160 and 164.

Figure 13:
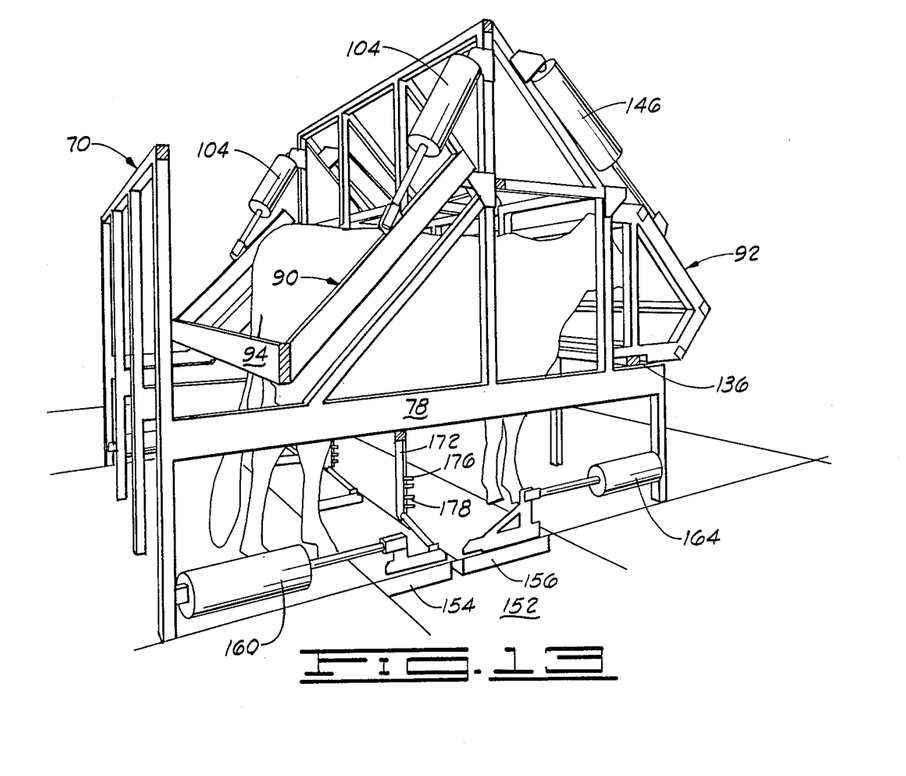
FIG. 13 is another schematic perspective view showing the position of the equipment when the cow is initially in a milking position in a stall.

When the cow is fully into the stall, the entry gate 90 is closed by the rams 104 as indicated in FIG. 13. At this time, the entry gate is locked into position. The rear of the cow will be near or in contact with the bar 94 of the entry gate 90 and the breast of the cow will be near or in engagement with the cross bar 136 of the exit gate 92, such that the fore and aft position of the cow will be relatively closely controlled. Also, of course, the sides of the cow will be close to the horizontal rails 78, such that the total position of the cow will be relatively closely controlled.

Figure 14:
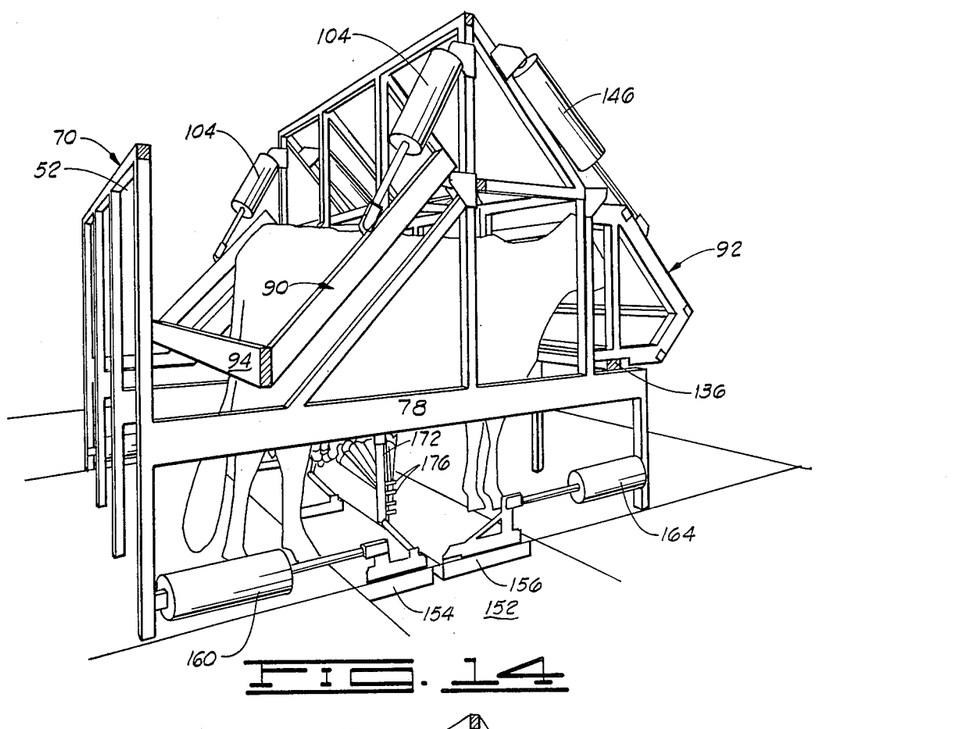
FIG. 14 is a perspective view illustrating the position of the equipment when the udder and teats of a cow are being sprayed for cleaning.

With the cow in the secure position in the stall, the water supply is energized to spray water from the spray nozzles 176 against the opposite sides of the udder and teats of the cow. Since the position of the cow is relatively closely controlled in the stall, it will be apparent that the nozzles 176 can be easily arranged to spray the water and soap solution effectively onto the cow's udder and teats.

Figure 15:
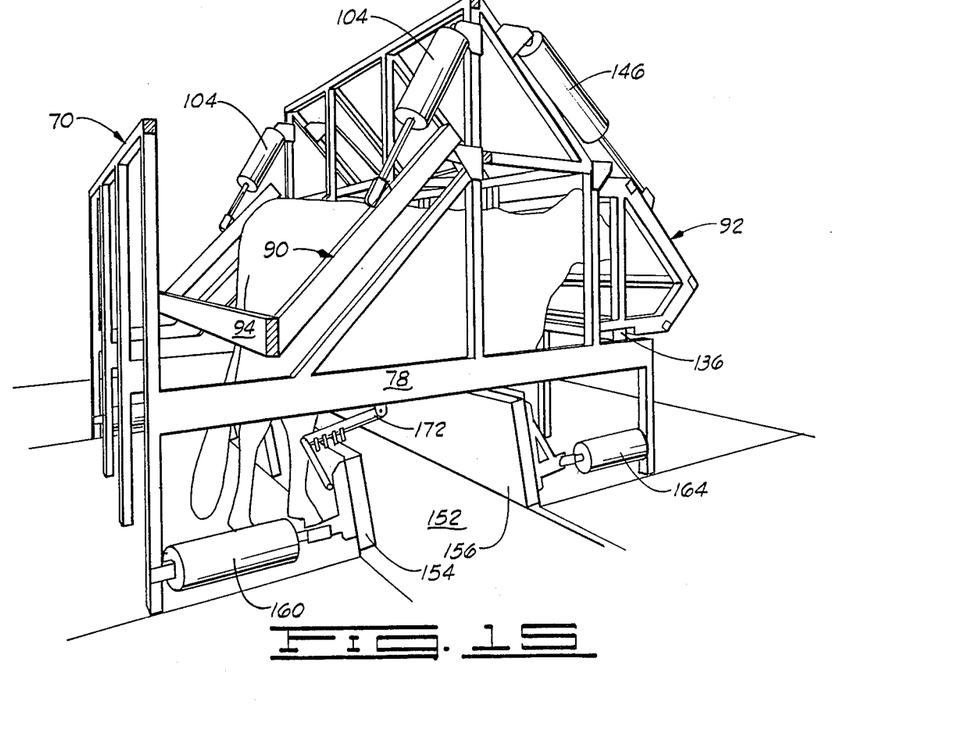
FIG. 15 is a perspective view showing the position of the equipment in the next step in the operation showing the doors open.

A few seconds after the water spray has stopped, the doors 154 and 156 are opened by the rams 160 and 164 as illustrated in FIG. 15. This action will move the spray bar 172 into a position fairly well clear of the elongated opening 152. Likewise, the doors 154 and 156 will be clear or virtually clear of the elongated opening 152.

The cart 184 is then driven along the elongated opening 152 with the working platform of the car elevated. The first worker on the cart proceeds to partially dry the cow's udder and teats with a suitable cloth or paper towels. As the cart 184 continues to advance, the second worker completes the drying operation. Then, the third worker tests the cow's milk by manually squirting a small amount of milk from each teat into a separate container (not shown). This third worker will usually determine whether the milk from each teat is acceptable. If the milk from any teat is not acceptable, he will suitably mark the cow, as with spray paint in order that the particular cow can be directed to a treatment center when the milking operation is complete. The fourth worker proceeds to connect the teat cups 204 onto the acceptable cow's teats as illustrated in FIG. 16. Just prior to the placement of the particular teat cups 204 into position on the cow's teats in a particular stall, the respective teat cups 204 are placed in communication with the vacuum header, such that the resulting vacuum will hold the teat cups in place and the milking action begins.

The arrangement of the stalls is such that the first worker is starting to dry the cow in the second stall, the second worker is completing the drying of the first cow, etc., on down the row of stalls. The speed of movement of the cart is controlled such that the milking operation can be completed, insofar as the workers on the cart are concerned, without starting and stopping the cart, except for unusual problems, such as a malfunction in some part of the system or operation.

Figure 17:
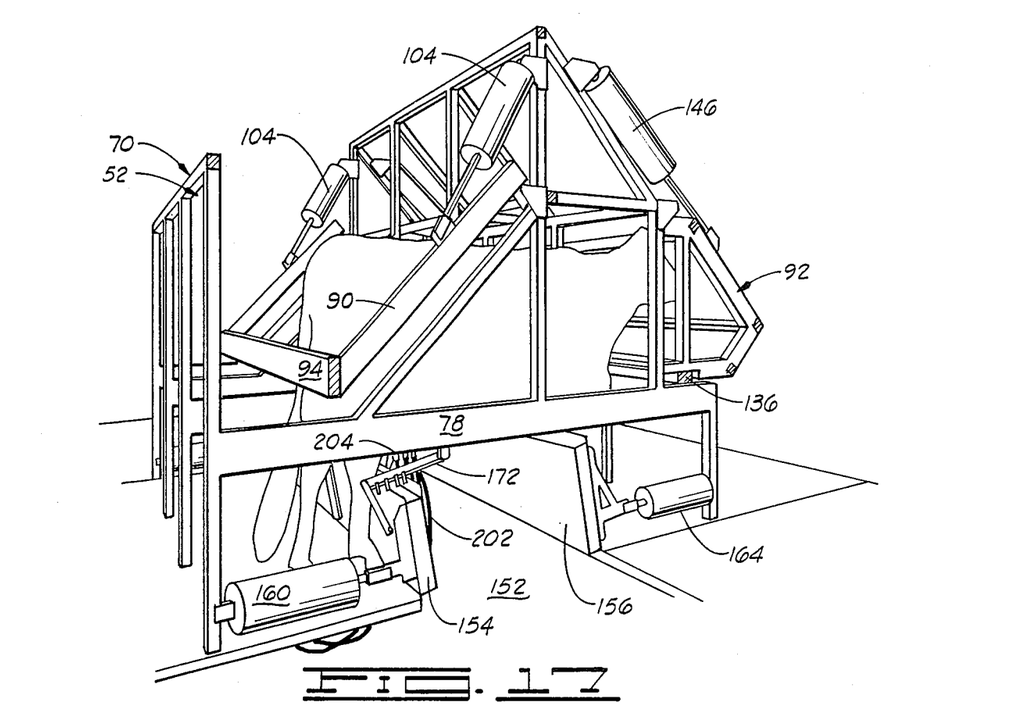
FIG. 17 is a perspective view of the equipment during the milking of a cow.

FIG. 17 illustrates the condition of the various pieces of equipment after the cart 184 is moved on past the particular stall where it will be observed that the teat cups 204 are maintained in relation to the teats of the cow for the continuation of the milking operation with the doors 154 and 156 open.

Figure 18:
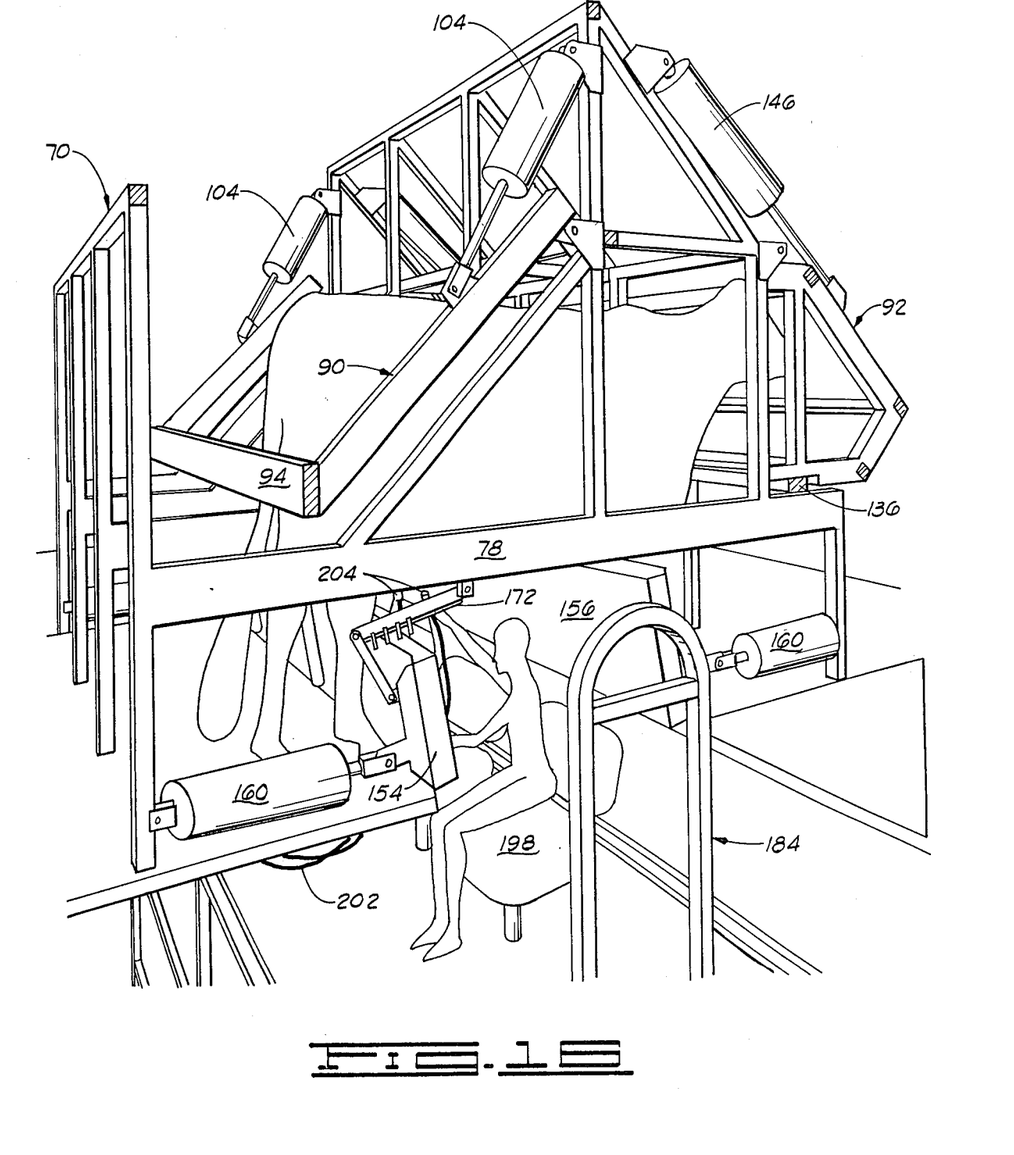
FIG. 18 is a perspective view showing the position of the equipment in the next step of the operation showing the teat cups released.

The milking of each cow is timed at four minutes. Thus, at the end of that time, the suction to each teat cup is disconnected. With the break of the suction, the teat cups will drop off the teats of the cow and will fall downwardly through the elongated opening 152 to be suspended from the door 154 for a subsequent milking operation. This condition is indicated in FIG. 18.

Figure 19:
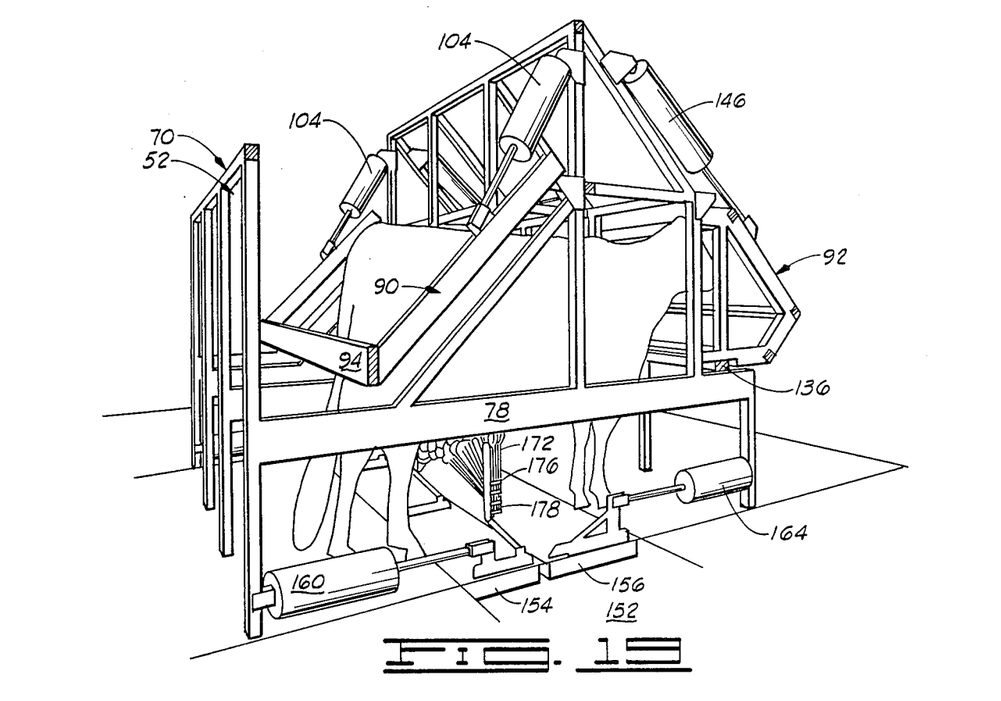
FIG. 19 is a perspective view illustrating the position of the equipment in the final step of the operation where the teats and udder of the cow are sterilized.

After all of the teat cups in a particular module of stalls have been removed, the doors 154 and 156 are closed as illustrated in FIG. 19 to again bring the spray bar 172 in the desired spraying position; whereupon the source of iodine is directed to the spray nozzles 178 at both sides of all of the stalls of the module to sterilize the udder and teats of all the cows in the module.

Figure 20:
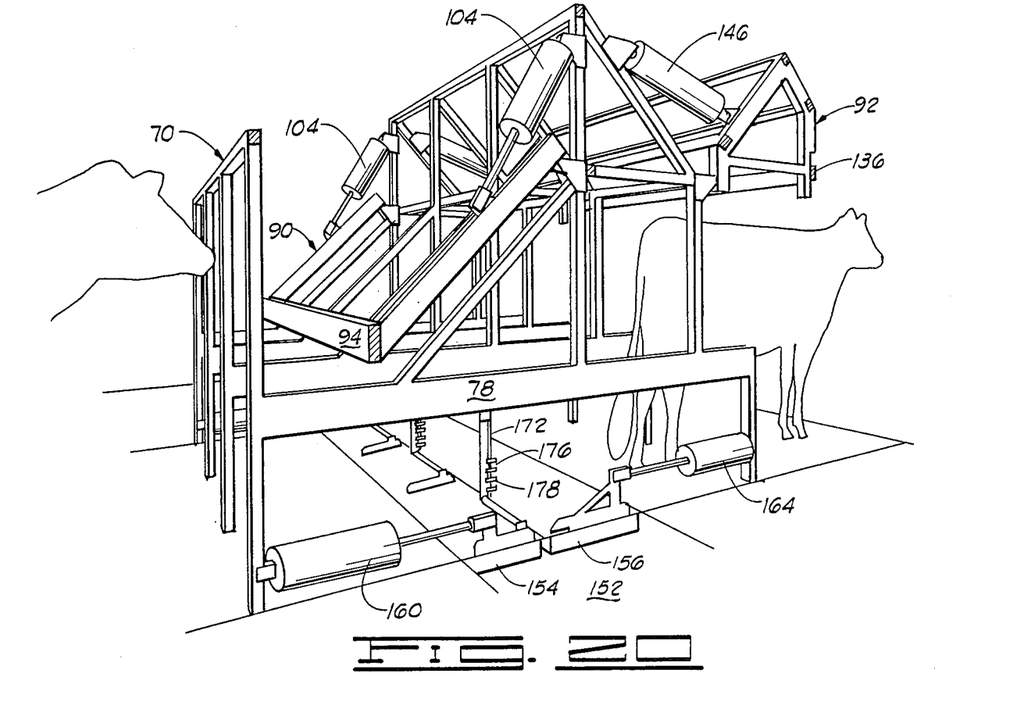
FIG. 20 is a perspective view showing the position of the equipment during the exit of a cow from a stall.

When the iodine spray has stopped, the exit gate 92 is unlocked and then swung to the open position as illustrated in FIG. 20 where the cross bar 136 is well above the height of the cow. With the doors 154 and 156 closed, the cow is free to walk over a substantially unobstructed surface out of the stall. As soon as the cow has exited the stall, then the exit gate 92 is closed and locked as indicated in FIG. 6 for a repeat of the cycle.

As the cows from each module are released from the stalls, they are directed out of the milking parlor along the arrow 60 or 62 as indicated in FIG. 1. Then, a new supply of cows can be milked.

With a complete milking system as illustrated in FIGS. 1, 2 and 3, the cart 184 will be driven around the path 68. In a typical milking parlor, openings 206 and 208 may be provided at the ends of the rows of milking stalls as shown in FIG. 1, which leaves the space 54 between the rows of stalls open for the entry of cows. And, the upper floor at the opposite end of the parlor may be completely open to provide an opening 210 communicating with both of the respective ends of the rows of milking stalls. With this arrangement of a milking parlor, the operator's cart 184 will be retracted as illustrated in FIGS. 9 and 10 to lower the working platform 192 when the cart is traversing the area between the openings 206 and 208. Assuming the cart is in a clockwise pattern of movement, the working platform would be lowered when the cart reaches the opening 208 in order for the cart to pass over to the opening 206. At the opening 206, the working platform of the cart would be raised to the position shown in FIGS. 7 and 8, such that the workers could proceed to milk the cows in the upper row of stalls shown in FIG. 1 in succession in the manner previously described.

It will be understood by those skilled in the art that various types of automatic controls may be employed on the present milking system to either fully or completely automate the opening and closing of the gates 90 and 92; the operation of the water spray nozzles 176 and iodine spray nozzles 178; the opening and closing of the doors 154 and 156, along with the initiation and stopping of the milking machine associated with each module. For example, suitable electric eyes could be provided to close the entry gate as soon as all stalls of the module are filled. As soon as the entry gate is closed, the water spray could be started. Forty-nine point five (49.5) seconds after the water spray is started, the large door 156 could be opened. One second later, the second door 154 could be started in its opening movement. The cow's udder and teats could be dried in two operations of very few seconds each; the milk tested in very few seconds, and the teat cups could be connected in the next very few seconds. Normally, a milking operation is maintained for four minutes. Substantially immediately after the milk suction stops at the last stall of the module, the doors 154 and 156 may be closed, since the teat cups will automatically drop off. Immediately upon closing of the doors 154 and 156, the iodine spray nozzles can be initiated. Five seconds after the beginning of the iodine spray, the exit gate 92 can be unlocked and opened. The presence of cows in all the stalls of a module could be detected by electric eyes, such that the exit gate could be closed as soon as all the cows have left the stalls of the module, and the entry gate could, at the same time, be opened. The system would then be in condition for a new cycle of operation.

Alternate Embodiment

Figure 21:
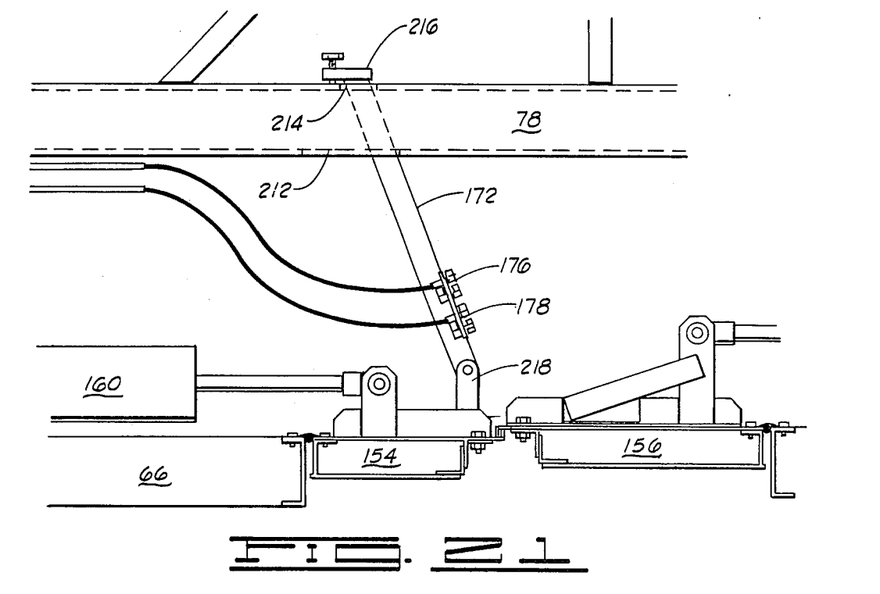
FIG. 21 is a schematic side view, partially in cross section of an alternate embodiment with the spray bar in a down position.
Figure 22:
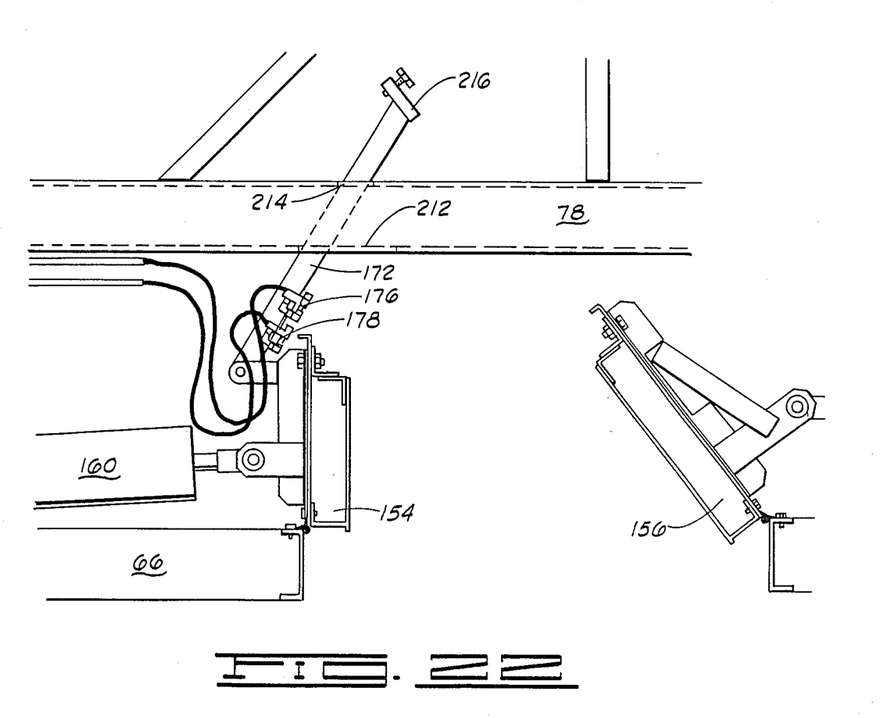
FIG. 22 is a view similar to FIG. 21 with the spray bar raised.

As shown in FIGS. 21 and 22, each spray bar 172 can be extended through slots 212 and 214 in the respective rail 78 and provided with a stop 216 on its upper end. The lower end of the bar 172 is, in this embodiment, pinned to a bar 218 rigidly secured to the door 154.

With this alternate embodiment, the stop 216 engages the top of the rail 78 when the door 154 is in a closed position to support the doors 154 and 156. Then, there is no need for the separate supporting cables 168.

Changes may be made in the combination and arrangement of parts or elements as heretofore set forth in the specification and shown in the drawings without departing from the spirit and scope of the invention as defined in the following claims.

What is claimed is:

1. A cow milking system, comprising:
an upper floor having an elongated opening therein;
door means hinged to the upper floor for opening and closing the elongated opening;
a framework on the upper floor forming a plurality of side by side milking stalls traversing the elongated opening for holding a plurality of cows with their front feet on one side of the elongated opening and their back feet on the other side of the elongated opening;
spray means carried by the framework for spraying the udder and teats of a cow positioned in each stall;

milking means including teat cups at each stall location;

a lower floor beneath the elongated opening;

an operator's cart movably supported on the lower floor for movement along the elongated opening successively beneath the stalls; and means for opening and closing the door means, whereby after a cow is in a stall and after the udder and teats have been sprayed, an operator on the cart can install the teat cups for a milking operation, the door means may be closed and the cow removed from the stall.

2. The system defined in claim 1 wherein the door means comprises:

a pair of overlapping doors, one hinged to the floor at each side of the elongated opening for swinging movement upwardly in an opening motion; and said means for opening the door means comprises a pneumatic ram for each door and control means for the rams for opening the uppermost door before the lower door and closing the uppermost door after closure after the lower door.

3. The system defined in claim 2 characterized further to include means connected to the framework and the free end of the lower door of a length to provide support for the doors when the doors are closed.

4. The system defined in claim 1 wherein the framework includes:

horizontal rails at each side of each stall for limiting the sidewise movement of a cow in a stall;

an entry gate at one end of each stall pivotally supported on the framework to swing about a horizontal axis;

an exit gate at the opposite end of each stall pivotally supported on the framework to swing about a horizontal axis; and means for opening the entry gate to admit a cow into the stall, closing the entry gate, opening the exit gate a predetermined time after milking of the cow in the stall ends, and closing the exit gate after the milked cow leaves the stall and before the entry gate is next opened.

5. The system defined in claim 4 wherein said means for opening and closing the gates include pneumatic rams.

6. The system defined in claim 5 wherein the framework is constructed to form a module of a predetermined number of stalls; and one entry gate and one exit gate span all of the stalls in the module.

7. The system defined in claim 1 wherein the spray means includes a first set of spray nozzles and a water supply connected to the first set of spray nozzles.

8. The system defined in claim 7 wherein the spray means further includes a second set of spray nozzles and a supply of a disinfectant connected to the second set of spray nozzles.

9. The system defined in claim 8 characterized further to include a spray bar supporting both sets of spray nozzles having one end thereof pivotally connected to the framework above the elongated opening and the other end thereof pivotally connected to the door means whereby the spray bar is moved to a position substantially removed from above the elongated opening when the door means is opened.

10. The system defined in claim 1 wherein the operator's cart comprises:

a base member;

wheels for supporting the base member on the lower floor;

a working platform;

lift means adjustably supporting the working platform on the base member in a raised position, and, alternately, in a lowered position; and at least one operator's seat on the working platform.

11. The system defined in claim 10 wherein the lift means comprises a scissors lift.

12. A cow milking system, comprising:

an upper floor having an elongated opening therein;

door means hinged to the upper floor for opening and closing the elongated opening;

a framework on the upper floor forming a plurality of side by side milking stalls traversing the elongated opening for holding a plurality of cows with their front feet on one side of the elongated opening and their back feet on the other side of the elongated opening;

milking means including teat cups at each stall location;

a lower floor beneath the elongated opening;

an operator's cart movably supported on the lower floor for movement along the elongated opening successively beneath the stalls; and means for opening and closing the door means, whereby after a cow is in a stall an operator on the cart can install the teat cups for a milking operation, then the door means may be closed and the cow removed from the stall.

* * * * *